June 28, 1960 B. D. LOUGHLIN 2,943,142

COLOR-TELEVISION SYSTEM

Original Filed Jan. 22, 1951 6 Sheets-Sheet 1

INVENTOR.
BERNARD D. LOUGHLIN
BY Laurence B. Dodds
ATTORNEY

INVENTOR.
BERNARD D. LOUGHLIN
BY Laurence B. Dodds
ATTORNEY

June 28, 1960 B. D. LOUGHLIN 2,943,142

COLOR-TELEVISION SYSTEM

Original Filed Jan. 22, 1951 6 Sheets-Sheet 3

INVENTOR.
BERNARD D. LOUGHLIN
BY Laurence B. Dodds
ATTORNEY

June 28, 1960 B. D. LOUGHLIN 2,943,142

COLOR-TELEVISION SYSTEM

Original Filed Jan. 22, 1951 6 Sheets-Sheet 4

*INVENTOR.*
BERNARD D. LOUGHLIN

*BY* Laurence B. Dodds

ATTORNEY

INVENTOR.
BERNARD D. LOUGHLIN
BY Laurence B. Dodds
ATTORNEY

June 28, 1960 B. D. LOUGHLIN 2,943,142

COLOR-TELEVISION SYSTEM

Original Filed Jan. 22, 1951 6 Sheets-Sheet 6

INVENTOR.
BERNARD D. LOUGHLIN
BY Laurence B. Dodds
ATTORNEY

United States Patent Office 2,943,142

Patented June 28, 1960

2,943,142

COLOR-TELEVISION SYSTEM

Bernard D. Loughlin, Huntington, N.Y., assignor to Hazeltine Research, Inc., Chicago, Ill., a corporation of Illinois Continuation of application Ser. No. 207,154, Jan. 22, 1951. This application Apr. 22, 1957, Ser. No. 654,421

9 Claims. (Cl. 178—5.2)

*General*

The present invention relates, in general, to color-television systems and, particularly, to such systems in which color information relating to an image is translated from one component of the system to another effectively as time-sequential modulation signals of a subcarrier wave signal. The invention has specific application to the latter such systems in which color errors occur in an image reproduced from signals related to the translated signals when the device at the receiver for deriving the related signals is not in proper phase relation to the device at the transmitter for effecting the time-sequence modulation of the wave signal. A particular form of the invention relates to a signal-translating system for reducing the effects of such color errors.

This application is a continuation-in-whole of application Serial No. 207,154, filed Jan. 22, 1951, now abandoned.

In one form of a color-television system to which the present invention relates and which is more fully described in the RCA Review for December, 1949, vol. X, pages 504–524, inclusive, and in United States Patent No. 2,774,072, color signals individually representative of the basic colors, specifically green, red, and blue, of a color image are developed at a transmitter. Components of these color signals are applied to a time-sequential modulation system effectively to modulate, in a predetermined phase sequence, a subcarrier wave signal also applied to the modulator. The modulated subcarrier wave signal, designated as the composite color signal, has a predetermined carrier frequency and has amplitude and phase characteristics related to the color-signal characteristics. Specifically, the subcarrier wave signal is modulated at 120° intervals by successive ones of the three color signals relating to the green, red, and blue characteristics of the image. A signal representative of the brightness of the image is also developed at the transmitter. The composite color signal and the brightness signal are then combined and transmitted in a conventional manner.

The receiver in such a system intercepts the transmitted signal and derives the composite color signal and brightness signal therefrom. The modulation components of the composite color signal are sequentially detected by a deriving means which is designed to operate in synchronism and in proper phase relation with the modulating means at the transmitter. It is intended that the deriving means develop in the output circuit thereof color-signal components which correspond, in all of their important characteristics, with the components utilized to modulate the subcarrier wave signal at the transmitter and, since several signals modulate the subcarrier, it is particularly important that the deriving means operate at a predetermined phase relationship with respect to the modulating means. The derived components then are combined with the brightness signal to reproduce on the image-reproducing device of the receiver a color image corresponding to the image at the transmitter.

There has also been described in United States Patent No. 2,773,929 an improvement on the system just described wherein the color-signal components at the transmitter modulate the subcarrier wave signal at 0°, 90°, and 180° phase positions with respect to the phase of the subcarrier wave signal. In such a system, since the signals are in quadrature relationship and two of the signals are inversely related, the modulation and deriving equipments are simplified. These and other advantages are described in the patent referred to immediately above.

In the systems just described, as has been stated, the deriving means at the receiver should operate, for each of the derived components, at a phase or time related to a corresponding phase or time of the modulation means at the transmitter. Very complex circuit arrangements have been proposed and utilized to effect such proper relationship of phase in the two means. Though advances have been made, the complexity of the equipment utilized has been increased and the material limitations of the equipment involved still cause phase errors to occur so that the deriving means at the receiver may not exactly maintain the desired phase relationship between it and the modulating means at the transmitter. Such phase errors are undesirable since any errors in phase at the deriving means cause cross talk or intermodulation of the modulation color-signal components to appear in the derived components. This undesired intermodulation results in the reproduction of improper colors in the reproduced image and hence a reproduced color image which does not faithfully represent the televised image.

There are causes other than out-of phase operation of the modulating means and deriving means in a color-television system which may cause the phase errors just discussed to be developed, which errors no degree of precision in the relative timing of these equipments can prevent. More specifically, if the channel through which the composite color signal is translated does not have uniform amplitude and phase translation characteristics about the mean frequency of the composite signal, amplitude and phase errors will be developed in the components of the side band of the received composite color signal. Such nonuniform characteristics may result from band-width limitations or echoes in the transmission path. These phase errors cause cross talk between components of the composite color signal which in turn result in the reproduction of an inferior image. It is the purpose of the present invention to diminish the effects of such phase errors, regardless of the manner in which they are developed, in a reproduced color image.

It is an object of the present invention, therefore, to provide a new and improved color-television system which avoids the aforementioned limitations of prior systems of the type described.

It is another object of the present invention to provide a new and improved color-television system in which the effect of intermodulation between color-signal components is substantially reduced in the reproduced image.

It is still another object of the present invention to provide a new and improved color-television system in which the effect of phase errors resulting from improper timing between the color wave-signal modulator at the transmitter and the color wave-signal deriving means at the receiver is substantially reduced.

It is still a further object of the present invention to provide in a color-television system a new and improved signal-translating system in which the effect of intermodulation between color-signal components is substantially reduced in an image reproduced therefrom.

It is also an object of the present invention to provide new and improved units for a color-television system of the type under consideration.

It is still an additional object of the present invention to provide, in a color-television system of the type in which the signals related to the color characteristics of an image do not affect the visual brightness of the reproduced image, a new and improved color-television receiver which avoids the need for manual control of the hues of the reproduced image.

In accordance with a particular form of the invention, in a color-television receiver for translating a received subcarrier wave signal periodically modulated in different phase sequences by color-signal components which are representative of the color characteristics of an image to be reproduced, a signal-translating system comprises circuit means for supplying the modulated subcarrier wave signal. The system also includes detecting means coupled to the supply circuit means for deriving from the modulated subcarrier wave signal signals individually related to the color-signal components and means coupled to the detecting means for causing the detecting means to derive the related signals in two phase sequences, whereby the color fidelity of the image to be reproduced is improved.

Also in accordance with the invention, in a color-television transmitter, a signal-translating system comprises means for developing a plurality of color signals individually representative of the color characteristics of an image, means for developing a subcarrier wave signal, and means coupled to the signal-developing means for modulating the subcarrier wave signal by components of the color signals in two phase sequences.

For a better understanding of the present invention, together with other and further objects thereof, reference is had to the following description taken in connection with the accompanying drawings, and its scope will be pointed out in the appended claims.

In the drawings:

Figs. 1 and 5 are schematic diagrams together representing a color-television system in accordance with one form of the invention, Fig. 1 representing a receiver thereof and Fig. 5 representing a transmitter thereof;

Fig. 1*a* is a more complete schematic diagram of one of the units of Fig. 1;

Figs. 2*a*–2*e*, inclusive, are vector diagrams useful in explaining the operation of one of the units of the deriving means of Fig. 1;

Figure 1:
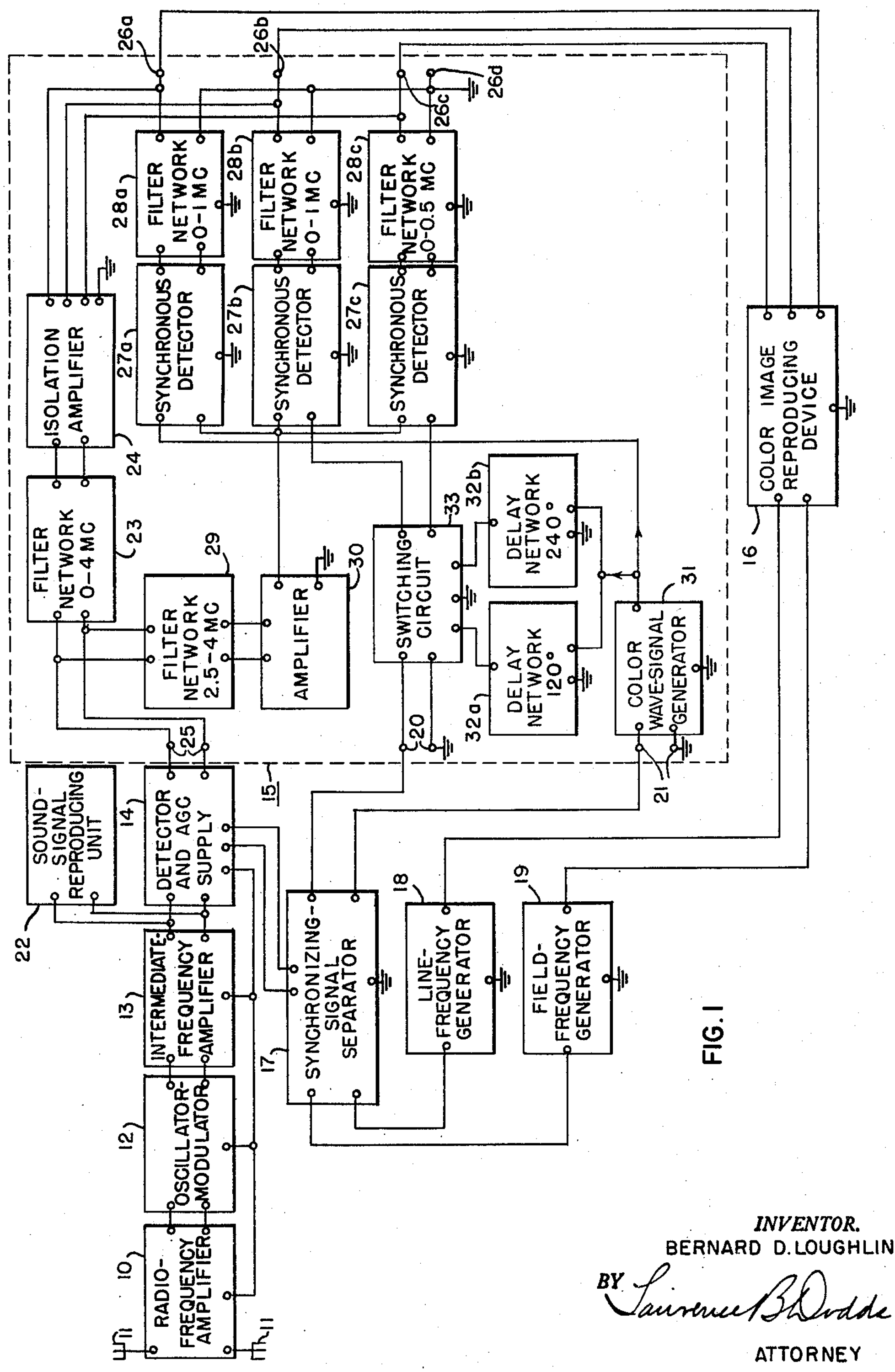

*General description of receiver of Fig. 1*

In describing the invention, reference will be made first to the receiver for the purpose of indicating the effects on the reproduced image of the limitations in the color-television system and the manner in which such a system may be modified to overcome such limitations.

Referring now to Fig. 1 of the drawings, there is represented a color-television receiver embodying a signal-translating system in accordance with one form of the invention. This receiver intercepts signals transmitted from a color-television transmitter, to be described more fully hereinafter, and translates a received composite color signal which is developed by a combining means at a transmitter from color-signal components which are representative of the color characteristics of an image and which are combined in a recurrently changing phase sequence. The receiver includes a radio-frequency amplifier 10 of one or more stages having an input circuit coupled to an antenna system 11, 11. Coupled in cascade with the output circuit of the amplifier 10, in the order named, are an oscillator-modulator 12, an intermediate-frequency amplifier 13 of one or more stages, a detector and automatic-gain-control (AGC) circuit 14, a signal-translating system 15 in accordance with the present invention and to be described more fully hereinafter, and a color image-reproducing device 16 preferably of the cathode-ray tube type. The device 16 may comprise three conventional cathode-ray tubes individually responsive to different color signals and an optical system for combining the images appearing on the image screens of these tubes into one color image or may comprise a single tube having separate cathodes individually responsive to the different color signals and an arrangement for directing the beams from the separate cathodes onto suitable color phosphors. The latter type of tube is more fully described in an article entitled "General Description of Receivers for the Dot-Sequential Color Television System Which Employ Direct-View Tri-Color Kinescopes" in the RCA Review for June 1950, at pages 228–232, inclusive.

There is also coupled to an output circuit of the detector 14 a synchronizing-signal separator 17 having output circuits connected to horizontal and vertical beam-deflecting windings in the device 16 through a line-frequency generator 18 and a field-frequency generator 19, respectively. Other output circuits of the separator 17 are coupled to pairs of terminals 20, 20 and 21, 21 in the system 15 for a purpose to be described more fully hereinafter. The output circuit of the (AGC) supply included in the unit 14 is connected to the input circuits of one or more of the tubes of the radio-frequency amplifier 10, the oscillator-modulator 12, and the intermediate-frequency amplifier 13 in a well-known manner.

A sound-signal reproducing unit 22 is also connected to the output circuit of the intermediate-frequency amplifier 13 and may include one or more stages of intermediate-frequency amplification, a sound-signal detector, one or more stages of audio-frequency amplification, and a sound-reproducing device.

It will be understood that except for the unit 15 the various units thus far described with respect to the receiver of Fig. 1 may have any conventional construction and design, the details of such units being well known in the art rendering a further description thereof unnecessary.

*General operation of receiver of Fig. 1*

Considering briefly the operation of the receiver of Fig. 1 as a whole and assuming for the moment that the unit 15 is a conventional device for deriving from a composite color signal, color-signal components related to the basic color characteristics of the televised image, a desired modulated television wave signal is intercepted by the antenna system 11, 11. The signal is selected and amplified in the radio-frequency amplifier 10 and applied to the oscillator-modulator 12 wherein it is converted into an intermediate-frequency signal. The intermediate-frequency signal is then selectively amplified in the amplifier 13 and applied to the detector 14 wherein its modulation components are derived. Of these components, at least the composite color signal is applied to the unit 15 wherein the brightness and color-signal components are derived therefrom and individually combined to develop color signals representative of the basic color characteristics of the televised image. These color signals are applied to suitable control electrodes of the cathode-ray tube or cathode-ray tubes in the device 16 to modulate the electron beam in each tube. The synchronizing-signal components of the received signal are separated from the other components thereof in the unit 17 and are utilized to synchronize the operation of the line-frequency and field-frequency generators 18 and 19, respectively, color-synchronizing signals being applied to terminals 20, 20 and 21, 21. The generators 18 and 19 supply signals of saw-tooth wave form which are properly synchronized with reference to the transmitted television signal and applied to the deflection windings of the cathode-ray tube or tubes in the unit 16. The combination of the horizontal and vertical deflection of the beam or beams and the intensity modulation thereof together with those elements of the device 16 which combine the effects of the beams related to the different color-signal components result in the reproduction of a color image of the subject being televised.

The automatic-gain-control or (AGC) signal derived in the unit 14 is effective to control the amplification of one or more of the units 10, 12, and 13 to maintain the signal input to the detector 14 and to the sound-signal reproducing unit 22 within a relatively narrow range for a wide range of received signal intensities.

The sound-signal modulated wave signal related to the desired television wave signal is also intercepted by the antenna system 11, 11 and effectively translated through the units 12 and 13 and applied to the unit 22. In the unit 22, it is amplified and detected to derive the sound-signal modulation components which are then further amplified and utilized to reproduce in a conventional manner the sound related to the televised image.

*Description of signal-translating system of Fig. 1*

Referring now in particular to the signal-translating system 15 embodying one form of the present invention, this may comprise a signal-translating channel including a 0–4 megacycle filter network 23 coupled in series with an isolation amplifier 24 between a pair of input terminals 25, 25 and, effectively, a plurality of output terminals 26*a*, 26*b*, 26*c*, 26*d*, though such units might be separate from the signal-translating system and be included as other portions of the receiver. The isolation amplifier 24 may be of any conventional type arranged to develop similar but isolated signals in the individual output circuits thereof and may, as will be seen hereinafter, be effectively included as part of the image-reproducing device 16 when a portion thereof performs a related combining function. The terminal 26*d* is a common ground terminal for the terminals 26*a*, 26*b*, and 26*c*.

Essentially the signal-translating system 15 includes means for deriving from the composite color signal applied to the terminals 25, 25 signals effectively and individually related to the color-signal components representing the green, red, and blue color characteristics of the televised image. The deriving means comprises a plurality of devices, specifically synchronous detectors 27*a*, 27*b*, and 27*c*, each having an output circuit coupled through a related one of the low-pass filter networks 28*a*, 28*b*, and 28*c* to related ones of the terminals 26*a*, 26*b*, and 26*c*. Detectors of a type suitable for use as units 27*a*, 27*b*, and 27*c* will be described more fully hereinafter with reference to Fig. 4. The networks 28*a* and 28*b* each have a pass band of substantially 0–1 megacycle while the network 28*c* has a pass band of substantially 0–0.5 megacycle. A 2.5–4 megacycle filter network 29 and an amplifier 30 are coupled in series between the terminals 25, 25 and input circuits of the detectors 27*a*, 27*b*, 27*c*.

The system 15 also includes means coupled to the deriving means arranged to maintain the deriving means in substantially synchronous relation with and at substantially a desired phase relation with the combining means at the transmitter and to cause the deriving means effectively to derive the related signals in one phase sequence. This means comprises a color wave-signal generator 31 having an input circuit coupled to the terminals 21, 21 and an output circuit coupled directly to an input circuit of the detector 27*a*. It also comprises delay networks or lines 32*a* and 32*b* coupled to the output circuit of the unit 31 and, through a switching circuit 33 to be described more fully hereinafter, individually to input circuits of the detectors 27*b* and 27*c*. The generator 31 is arranged to develop either independently or under the control of a signal applied thereto through the terminals 21, 21 a wave signal related in synchronism and phase to a similar wave signal at the transmitter. The delay lines 32*a* and 32*b* are proportioned respectively to have delay periods of 120° and 240° of a cycle of the signal developed in the generator 31.

Figure 1A:
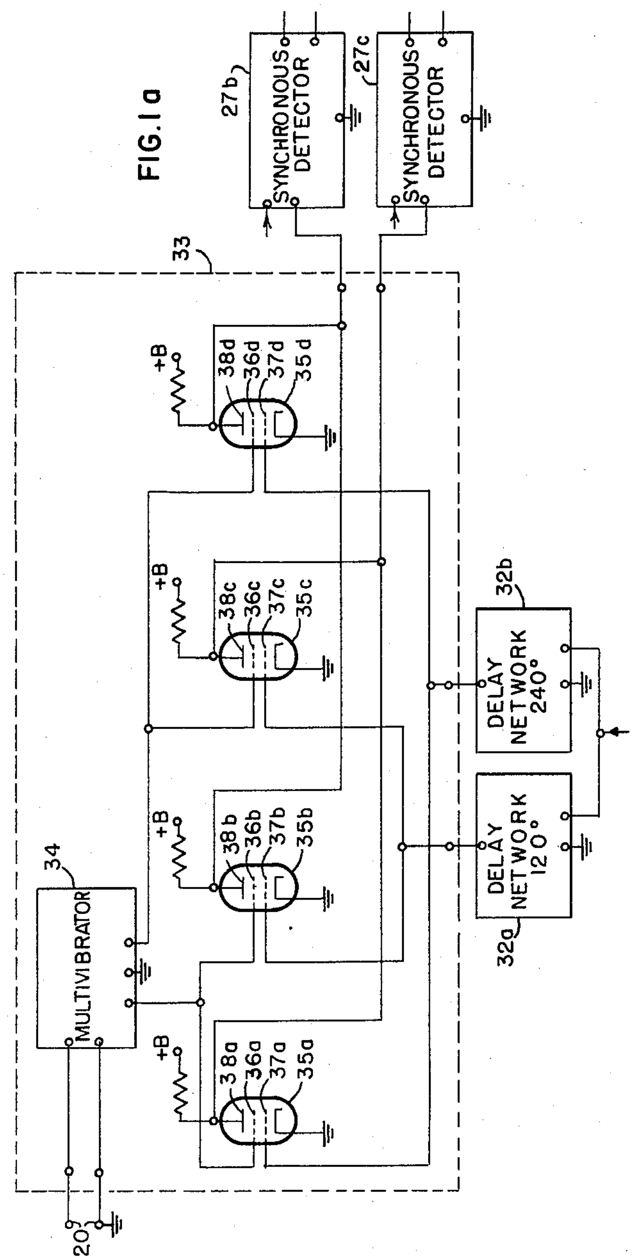

The system 15 includes a control device, specifically the switching circuit 33, arranged recurrently to cause the deriving means effectively to derive the related signals in another phase sequence. Essentially the switching circuit 33 is an electronic switching device having the characteristics of a double-pole double-throw reversing switch. A control means for the switching circuit 33, included therein and described more fully with respect to Fig. 1*a*, is coupled to the input terminals 20, 20. The switching circuit 33 is arranged periodically, specifically on every other image field, alternately to reverse the order of connection of the delay lines 32*a* or 32*b* to individual input circuits of the detectors 27*b* and 27*c* in synchronism with a corresponding operation at the related transmitter. A more complete representation of a type of switching circuit 33 is provided by Fig. 1*a* and this will now be described in more detail.

The circuit of Fig. 1*a* includes a control means, preferably multivibrator 34, having an input circuit coupled to the terminals 20, 20 and having at least a pair of output circuits. The switching circuit of Fig. 1*a* also includes a plurality of electronic switching devices, specifically gating tubes 35*a*, 35*b*, 35*c*, and 35*d* individually having two operating conditions, being conductive or substantially nonconductive. One of the output circuits of the multivibrator 34 is connected to similar control electrodes 36*a* and 36*b* of the gating tubes 35*a* and 35*b*, the other output circuit being connected to related control electrodes 36*c* and 36*d* of the gating tubes 35*c* and 35*d* thereby alternately in pairs to cause the tubes 35*a*, 35*b* and 35*c*, 35*d* to be conductive. The delay line 32*a* is coupled to control electrodes 37*b* and 37*c* of the tubes 35*b* and 35*c*, respectively, while the delay line 32*b* is coupled to control electrodes 37*a* and 37*d* of the tubes 35*a* and 35*d*, respectively. The detector 27*b* is connected to anode electrodes 38*b* and 38*d* of the tubes 35*b* and 35*d*, respectively, while the detector 27*c* is coupled to anode electrodes 38*a* and 38*c* of the tubes 35*a* and 35*c*, respectively. The multivibrator 34 is arranged to cause the tubes 35*a*, 35*b* and 35*c*, 35*d* during successive scanning fields alternately to be conductive and nonconductive thereby alternating the manner in which the delay lines 32*a* and 32*b* are connected to the detectors 27*b* and 27*c*.

The multivibrator circuit 34 may be of a conventional type arranged to operate in different modes in alternate fields. In an odd-line interlaced system the timing or spacing of the equalizing and broad field pulses with relation to the line-synchronizing pulses differs on alternate fields. The line-synchronizing pulse coincides with an equalizing or field pulse in one field and there is no such coincidence in the next field. Therefore, the multivibrator circuit may be arranged to respond to a line-synchronizing pulse and a specific field or equalizing pulse when they coincide during the one group of fields, thus operating in one mode in response thereto and to operate in another mode when the pulses do not coincide thereby effecting the desired switching.

*Explanation of operation of signal-translating system of Fig. 1*

In explaining the operation of the signal-translating system 15 of Fig. 1, for purposes of brevity and clarity, the operation of the system will first be explained with the delay line 32*a* effectively connected to the detector 27*b* and the delay line 32*b* effectively connected to the detector 27*c*. When so connected, the system 15 is similar to a related system described in United States Patent No. 2,774,072.

Referring now to the system 15 of Fig. 1, video-frequency signals including brightness components and a composite color-signal component are applied to the terminals 25, 25. The brightness components relate to the light intensity of the televised image and are translated through the network 23 and amplified in the unit 24. The amplified 0–4 megacycle components are developed in three isolated output circuits in the unit 24 and individually applied to the terminals 26*a*, 26*b*, and 26*c*.

The 2.5–4 megacycle portion of the video-frequency signal applied to the terminals 25, 25, comprising the composite color-signal component thereof is selected and translated through the network 29, amplified in the unit 30 and applied to input circuits in the detectors 27*a*, 27*b*, 27*c*. Since the television system of which the signal-translating system 15 is a part is of a type that utilizes suppressed subcarrier transmission for the color-signal components, the subcarrier wave signal related to the color-signal components is injected at the receiver by the generator 31. The frequency and phase of the signal developed in the generator 31 is controlled by a signal derived in the synchronizing-signal separator 17 and applied to the generator 31 through the terminals 21, 21 so that the signal developed in the generator 31 is related in frequency and phase to the color subcarrier wave signal developed at the transmitter. The signal developed in the generator 31 is applied directly to the detector 27*a*, but is applied through the delay line 32*a* with a delay of 120° in the phase thereof to the detector 27*b* and through the delay line 32*b* with a delay of 240° in phase to the detector 27*c*. The signal applied to the detectors 27*a*, 27*b*, and 27*c* from the generator 31 controls the sequence of operation of these detectors so that the detector 27*a* derives those modulation components of the composite color signal applied thereto which are in phase with corresponding portions of the signal developed in the generator 31. The detectors 27*b* and 27*c* derive those modulation components of the composite color signal applied thereto which are at effectively 120° and 240° phase positions, respectively, of the color wave signal. Thus, the sequence of operation of the detectors 27*a*, 27*b*, and 27*c* is in the order of their mention.

The detector 27*a* is arranged to derive the color-signal component related to one of the basic colors of the televised image, specifically the green color thereof, and the 0–1 megacycle portions of these derived signals are then translated through the network 28*a* and applied to the terminal 26*a* wherein they combine with the brightness components translated through the amplifier 24 to develop a color signal which represents the green coloring of the televised image. Similarly, the detector 27*b* derives those components related to the red color of the televised image and detector 27*c* derives those components related to the blue color of the televised image. Since the color contribution of blue in the reproduced image is of a low order, only the 0–0.5 megacycle portion of the components related to blue need be translated through the network 28*c* and applied to the terminal 26*c*. The green, red, and blue color signals on the terminals 26*a*, 26*b*, and 26*c*, respectively, are applied to individual input circuits in the image-reproducing device 16 therein to combine to reproduce the color image in the manner previously described.

The problems created by the type of synchronous detection or time-sequential detection just described and their solution by means of an arrangement in accordance with the present invention may be more fully understood by reference to the vector diagrams of Figs. 2*a*–2*e*, inclusive.

For purposes of explanation, it will be assumed that the signals developed at the transmitter and intercepted by the receiver are of a type described in the article previously referred to appearing in the December 1949 issue of the RCA Review. The television signals comprise brightness or monochrome components and color-signal components. In such a system the monochrome component is defined as follows:

$$M = \tfrac{1}{3}G + \tfrac{1}{3}R + \tfrac{1}{3}B \qquad (1)$$

where

M represents the monochrome or brightness component and

G, R, and B individually represent the color signals related respectively to the green, red, and blue characteristics of the televised image.

Also, in the RCA system being described, the peak amplitude of the subcarrier wave signal developed at the transmitter, when modulated by a saturated color-signal component, is two-thirds that of the signals derived in the output circuits of the cameras. Thus, components of the subcarrier wave signal having the peak amplitudes ⅔G, ⅔R, and ⅔B occur at the 0°, 120° and 240° phase points of the wave signal and are represented by Fig. 2*a*.

Figures 2A, 2B, 2C, 2D, 2E:
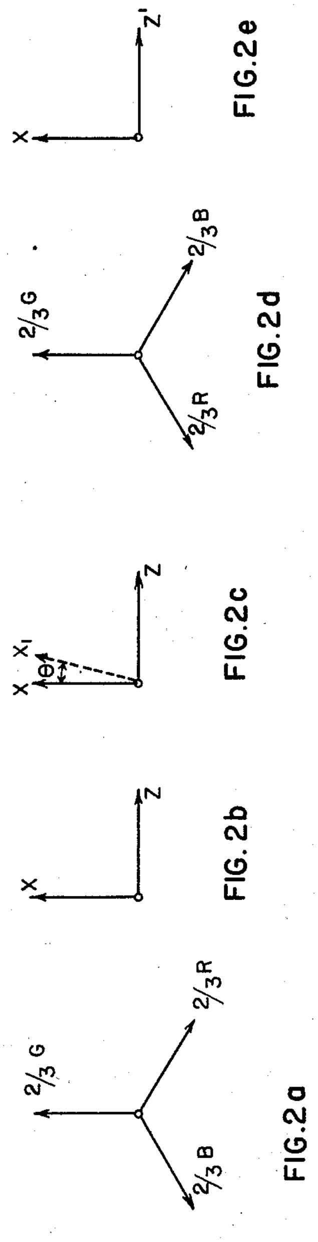

Since there are only two degrees of freedom, specifically freedom in amplitude and freedom in phase for a sine type of wave signal of a given frequency, the vector diagram represented by Fig. 2*a* may be represented by Fig. 2*b* as a quadrature-type vector diagram having the vectors X and Z. The trigonometric relationship of the signals represented by the vector diagrams of Figs. 2*a* and 2*b* will be seen more fully hereinafter. It is seen by an examinatiton of Fig. 2*b* that when the receiver color-signal detecting means operates to derive the component occurring at 0° with respect to the color wave-signal frequency, that is to derive the component related to the green characteristic of the image, the following signal is obtained:

$$\tfrac{2}{3}G - \tfrac{1}{3}R - \tfrac{1}{3}B = G - M = X \qquad (2)$$

Similarly, in quadrature with X, the vector Z is defined:

$$Z = 0.866(\tfrac{2}{3}R - \tfrac{2}{3}B) \qquad (3)$$

Such derived signals may be called color-difference signals since they represent the color signal minus the monochrome signal. At a later point in the circuit by combining the color-difference signal with the monochrome signal the proper color signal will be obtained. Thus:

$$(G - M) + M = G \qquad (4)$$

The above analysis indicates the composition of a signal derived when the deriving means at the receiver is in phase with the modulating means at the transmitter. If the deriving means does not bear such phase relationship to the modulating means but is out of phase therewith as indicated by the vector $X_1$ in Fig. 2*c*, then the derived signal is not defined by Equation 2 above. The latter derived signal is defined by adding together the proper proportions of the vectors X and Z. Thus it would have a composition as follows:

$$(G - M_1) = X_1 = \cos\theta(\tfrac{2}{3}G - \tfrac{1}{3}R - \tfrac{1}{3}B) + \sin\theta(0.866)(\tfrac{2}{3}R - \tfrac{2}{3}B) \qquad (5)$$

It is seen that if the misphasing angle $\theta$ is small, the cos $\theta$ term is very close to unity and to the extent that cos $\theta$ differs from unity, the cosine portion of the Equation 5 indicates merely some desaturation of the derived component causing a desaturation of the corresponding color. The sine term of the Equation 5 is the most important and creates the greatest problem since even when the angle $\theta$ is small this term indicates a significant amount of color-signal cross talk in the derived component causing a color shift in the color reproduced. Calculations using Equations 1, 4, and 5 will show that when there is approximately a 10 degree misphasing between the deriving means and the modulating means, there is approximately 10% cross talk between the color-signal components. It is the elimination of the effect of the sine term that is desired in order to diminish the effects of misphasing between the deriving means and the modulating means.

Figs. 2*d* and 2*e* are analogous to Figs. 2*a* and 2*b* and indicate graphically the manner in which the effective cancellation of the sine term of Equation 5 above is accomplished. Fig. 2*d* is similar to Fig. 2*a* except for the fact that the vectors relating to the red and blue colors are interchanged indicating that the color-signal components are now derived in a different sequence. Because of this interchange of vectors, the vectors X and Z' of Fig. 2*e* have a different relationship to each other from those of Fig. 2*b*. The vector Z' is defined:

$$Z'=0.866(\tfrac{2}{3}B-\tfrac{2}{3}R) \quad (6)$$

The change in sequence of derivation of the color components as indicated by Fig. 2*d* now causes the vector $X_1$ of Fig. 2*c* to have the following composition:

$$X_1=\cos\theta(\tfrac{2}{3}G-\tfrac{1}{3}R-\tfrac{1}{3}B)+\sin\theta(0.866)(\tfrac{2}{3}B-\tfrac{2}{3}R) \quad (7)$$

It is seen that the initial or cos $\theta$ term of the Equation 7 is similar to the initial or cos $\theta$ term of the Equation 5 and that the desaturation of the color relating to the derived signal is still present but is not considered to be too objectionable. It is also seen that the sine terms of the Equations 5 and 7 are such as to cancel each other thereby effectively eliminating the color shift caused by misphasing between the deriving means and the modulating means.

The above explanation has been presented with relation to the derivation of the component relating to the green color. It is to be understood that similar effects occur with respect to the components relating to the red and blue colors. Nevertheless, the periodic change in the sequence of the derived components effectively cancels the color shift occurring due to cross talk into the channels translating the signals related to the red and blue colors. This cancellation occurs in a manner similar to that with respect to cross talk into the channel translating the signal related to the green color as described in detail above.

The circuit for effecting the periodic change in the sequence of derivation is the switching circuit 33. Referring now to the operation of the circuit of Fig. 1*a*, signals related to the field-scanning and line-scanning frequencies are applied to the multivibrator 34 to cause it to develop control signals related to alternate fields which are utilized to cause the unit 34 to operate in one of two stable operating conditions during any one field and in the other of the stable operating conditions during the successive field. When operating in one of such conditions, the gating tubes **35*a* and 35*b* are caused to be conductive, the tubes 35*c* and 35*d* remaining nonconductive, thereby effectively coupling the delay line 32*b* to the detector 27*c* and the delay line 32*a* to the detector 27*b*. Such a condition continues for the one field and color errors caused by misphasing of the detectors 27*a*, 27*b*, 27*c* may occur during that field as defined, for the derived component relating to green, by the Equation 5 above. During the next field, the multivibrator 34 switches to its second stable operating condition causing the tubes 35*a* and 35*b* to be rendered nonconductive and the tubes 35*c* and 35*d* to become conductive. The delay line 32*a* is thus effectively coupled to the detector 27*c* and the delay line 32*b* is coupled to the detector 27*b* so that the sequence of operation of the detectors 27*b* and 27*c*** is reversed, thereby deriving the components in the sequence represented by Fig. 2*d*. Such reversal during the subsequent field results in a reversal of the color error, as indicated by the Equation 7. The eye is capable of integrating the color or the chromaticity of an image over the two adjacent lines formed by the two fields and thus a substantial cancellation of the color error is effected by utilizing this integration characteristic of the eye.

Solely for simplicity of explanation, the above description of the operation of the detectors **27*a*, 27*b*, and 27*c***, in accordance with the teaching of the present invention, has been made with respect to only one of the basic colors of the image, specifically green. A more thorough analysis with respect to the other basic colors, and colors resulting from a combination of the basic colors, will demonstrate that problems of improper color reproduction with respect to such colors due to misphasing of the detectors are also solved by periodically changing the sequence in which the color-signal components are derived.

In a system such as that represented by Fig. 1 there will be some flicker between these two lines apparent to the eye since the eye is more sensitive to the brightness variations occurring on the two lines than to the color changes. Nevertheless, in a color image reproduced from the color signals relating to the green, red, and blue characteristics of a televised image and which have the above-described periodically changing sequence, the effect of any improper coloring caused by other than a predetermined phase relation between the operation of the detectors at the receiver and the modulator at the transmitter is substantially reduced. A system in which the brightness flicker also will be substantially eliminated will be described hereinafter with reference to Fig. 3.

Figure 3:
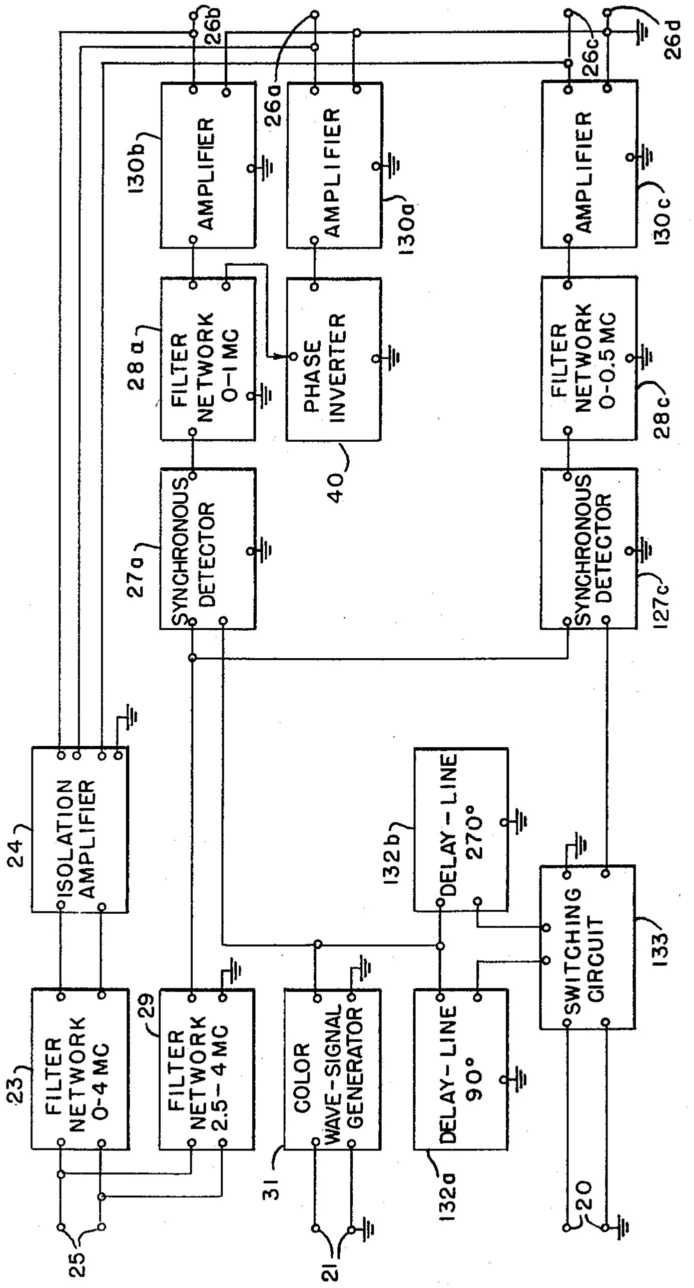
Figs. 3 and 7 are schematic diagrams of modified forms of a portion of the receiver of Fig. 1.

*Description of signal-translating system of Fig. 3*

Referring now to Fig. 3 of the drawings, a signal-translating system there represented is somewhat similar to the system 15 of Fig. 1 and, therefore, similar components have been designated by the same reference numerals with the addition of 100 thereto. A system such as that represented by Fig. 3 is more fully described in United States Patent No. 2,773,929 referred to above. This, as described in the patent just referred to, is a preferred type of system since changes in composite color signals do not produce changes in the visual brightness of the reproduced image.

The essential difference between the system of Fig. 3 and that of Fig. 1 relates to the phase relationship of the modulation components of the composite color-signal component. Whereas in the system of Fig. 1 such components have the relationship of 0°, 120°, and 240°, in the system of Fig. 3 such components have the relationship of 0°, 90°, and 180°. Also, in the system of Fig. 3, since it is well known that blue contributes very little to the brightness of an image as the eye is relatively insensitive to blue as compared to its sensitiveness to red and green, the brightness or monochrome component is composed only of green and red components. Though such a system is not thoroughly in accordance with the theory which defines the monochrome component as being composed of varying amounts of green, red, and blue components, such a system is simple as well as practical and is described herein to describe the invention with relation to systems of such type.

The brightness or monochrome component utilized in the latter system in view of the above discussion has the following composition:

$$M=\tfrac{2}{3}G+\tfrac{1}{3}R \quad (8)$$

and does not include any of the blue color signal. The color-difference signal at 0° phase is arranged to be:

$$R-M=\tfrac{2}{3}R-\tfrac{2}{3}G=-2(G-M) \quad (9)$$

From the Equation 9 it is seen that the signal at 180° is $2(G-M)$. The signal at 90° is $k(B-M)$ where $k$ is a desired gain factor such as ⅔ which will be used hereinafter. In view of these relationships, assuming that the red color-difference component is the component derived at 0° and is 180° out of phase with the green color-signal component derived at 180°, a common synchronous detector may be utilized for both. One signal, specifically $R-M$, is utilized as derived and the other, specifically $G-M$, is developed from the $R-M$ signal by means of a phase inverter. Thus, referring now to Fig. 3, a phase inverter 40 is coupled to an output circuit of the filter network **28*a*. Since varying amounts of amplification in a system of the type described are provided for each of the color-signal components, a plurality of amplifiers 130b, 130a, and 130c are individually coupled between the respective output circuits of the network 28a, the inverter 40 and the network 28c, and the terminals 26b, 26a, and 26c, respectively. The channel including the amplifier 130b is proportioned to have a gain of twice that of the channel including the amplifier 130a. The channel including the amplifier 130c is proportioned to have a gain of one and one-half that of the channel including the amplifier 130b or three times that of the channel including the amplifier 130a**.

Since the modulation components of the composite color wave signal have the phase relationship described above, only that signal in quadrature with the other two signals need be periodically reversed to effect the improved color reproduction which is characteristic of the present invention. Therefore, the delay networks 132a and 132b have common input circuits coupled to the output circuit of the generator 31 and have individual output circuits coupled to the equivalent of separate poles of a switching circuit 133 which has the characteristics of a single-pole double-throw switch. The element in the switching circuit 133 equivalent to the blade of a single-pole double-throw switch is coupled to a control circuit in the detector 127c so that the delay lines 132a and 132b are alternately connected to the control circuit in the detector 127c.

The switching circuit 133 may comprise a simplified form of the switching circuit represented by Fig. 1*a*, requiring only two gating tubes, or may consist of a conventional type of multivibrator circuit having two stable operating conditions, individual ones of which connect one of the input circuits of the detector 127c to individual ones of the delay lines 132a and 132b.

Since the signal applied to the detector 127c bears a quadrature relationship to the signals applied to the detector 27a, the delay lines 132a and 132b are respectively proportioned to effect a 90° and a 270° phase shift in the signal.

*Explanation of operation of system of Fig. 3*

Except for the operation of the detectors 27a and 127c and their associated circuits, the system of Fig. 3 operates in a manner similar to that of the system 15 of Fig. 1. The composite color-signal component is translated through the network 29 and applied to input circuits of the detectors 27a and 127c. The detector 27a is controlled by the generator 31 to operate at a predetermined phase relationship with the modulating means at the transmitter. The derived component representing the green and red color-difference components, specifically the signal R—M is then translated through the network 28a, through the amplifier 130b and combined with the brightness component on the terminal 26b. The color-difference component related to red is phase inverted by the inverter 40 to develop the green color-difference component, specifically the signal *G—M*, and the latter is translated through the amplifier 130a and combined with the brightness component on the terminal 26a to develop the green color signal. The switching circuit 133, depending upon its condition of operation, may cause the control signal developed in the generator 31 to be applied to the input circuit of the detector 127c at either a 90° or 270° phase relationship with respect to the signal applied to the detector 27a. Regardless of the phase condition, the color-difference component relating to the blue color, specifically the signal *B—M* is derived in the detector 127c at phase controlled by the circuit 133 and translated through the network 28c and the amplifier 130c with a gain of three times that of the signal translated through the amplifier 130a for application to the terminal 26c wherein it is combined with a brightness component to develop the blue color signal.

In the manner described with reference to the Fig. 1 embodiment, the switching circuit 133 is controlled to reverse the phase at which the detector 127c operates with respect to the detector 27a during alternate fields. Such operation is synchronous with a corresponding operation at the related transmitter.

Though the signal compositions of the right-angular vectors differ in the system of Fig. 3 from those of the related vectors in the system of Fig. 1, the effect of misphasing of the deriving means on the composition of the derived signal is similar and the diminishing of the effect of the color-signal cross talk developed thereby is obtained by periodically changing the sequence in which the color-signal components are derived.

The previous discussion with relation to the systems represented by Figs. 1 and 3 has indicated the advantages of the invention in diminishing the effects of cross talk between the color-signal components. The present invention has other advantages. The proper phase relationship between the combining means at the transmitter and the deriving means at the receiver may be determined simply by making the delay characteristics of the various time-delay networks adjustable at least to a small degree and then adjusting the phasing of the detectors to develop the maximum saturation of the reproduced colors, the previously encountered problem of attempting to adjust to correct hue being eliminated. Thus it has been described how any color errors caused by misphasing of the detectors may be canceled out over the period of two fields. But the misphasing of the detectors causes not only color errors but also some loss in signal intensity as indicated by the Equations 5 and 7 above. If the phasing of a color-signal detector is adjusted to develop a derived signal of maximum amplitude, the phasing of such detector is automatically properly adjusted with relation to the corresponding phase of the combining means at the transmitter. Therefore, the present invention also provides a means whereby color control can be effected by ascertaining that phasing of the deriving means in the receiver which will effect maximum saturation of the reproduced colors.

When using a system such as that described with reference to Fig. 3, the brightness flicker occurring on the adjacent lines of the alternate fields and previously mentioned with respect to the system of Fig. 1 will be substantially eliminated. As described in the patent referred to with respect to the Fig. 3 embodiment, one signal developed and transmitted relates primarily to the brightness of an image while other signals relate primarily to the chromaticity of an image. The receiver in such a system is arranged and proportioned so that the composite color signal does not affect the visual brightness of the reproduced image. Therefore, since the brightness is unaffected by any changes made with relation to the color-signal components, the brightness on the adjacent scanning lines of a reproduced image does not tend to vary in a manner to cause flicker while the chomaticity is alternately changed on these lines to avoid the reproduction of improper color.

It should also be noted that the invention permits the relative phasing of the synchronous detectors to vary somewhat without causing the appearance of improper colors in the reproduced image. The periodic change in sequence effectively cancels out such variations.

Figure 4:
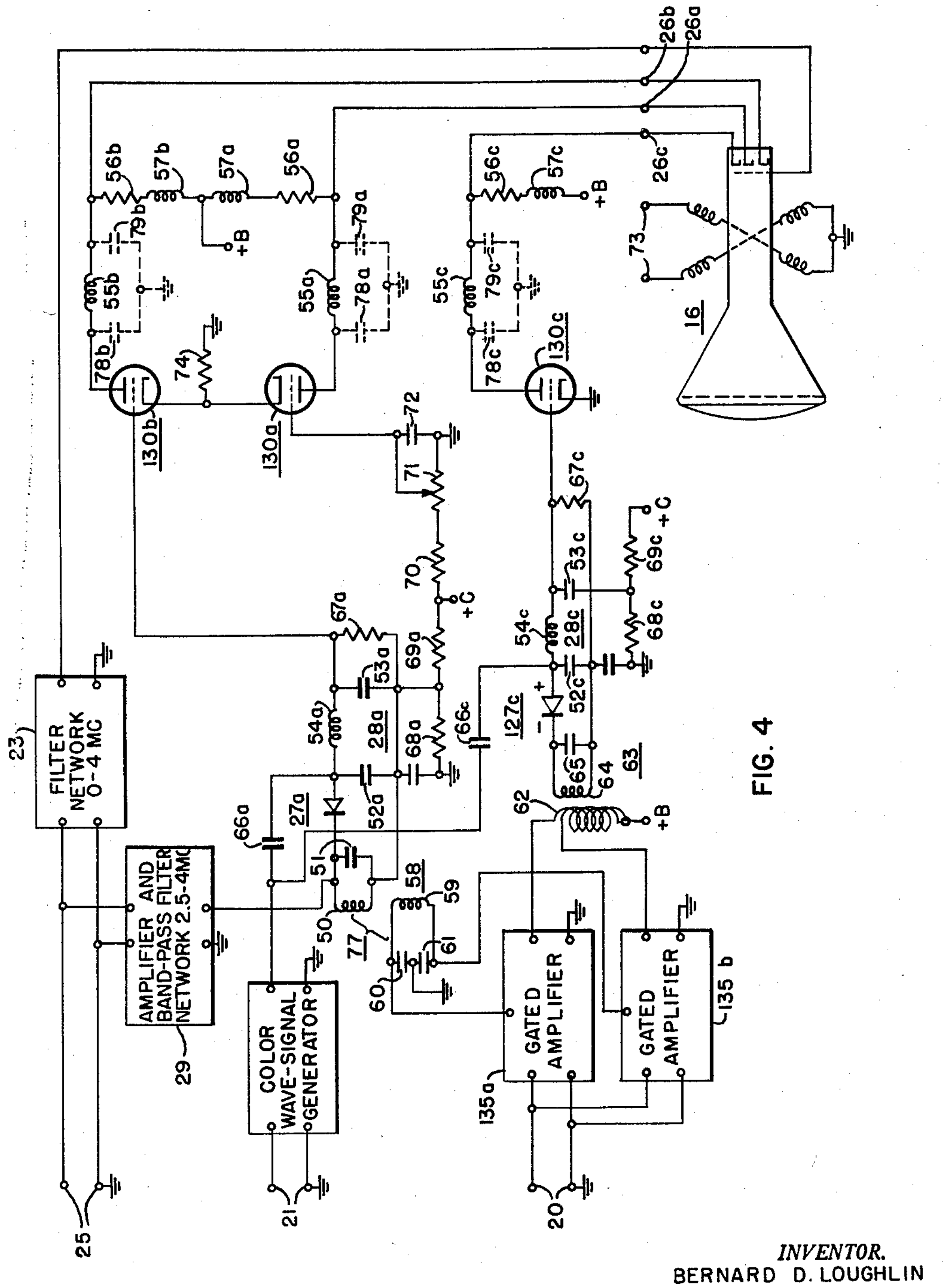
Fig. 4 is a circuit diagram, partially schematic, of a modification of a portion of the receiver of Fig. 1.

*Description of Fig. 4 embodiment of invention*

Fig. 4 is a circuit diagram of a signal-translating system of the type described with reference to Fig. 3 and also includes a more detailed representation of the manner in which the output signals on terminals 26a, 26b, and 26c are coupled to the input circuit of image-reproducing device 16 related to the device 16 of Fig. 1. Since Fig. 4 is closely related to Fig. 3, similar components are designated by the same reference numerals.

In the Fig. 4 embodiment, the channel for translating the brightness components of the composite video-frequency signal applied to the terminals 25, 25 includes the network 23 but does not include an isolation amplifier, the latter being effectively included in the device 16. The output circuit of the network 23 is directly coupled to a control electrode of the cathode-ray tube in the image-reproducing device 16. A parallel tuned circuit 77 resonant to a 2.5–4 megacycle band of frequencies and including an inductor 50 and a condenser 51 is coupled between the amplifier and band-pass filter network 29 and a semiconductor included in the synchronous detector circuit 27*a*. Modified $\pi$-type filter networks are utilized for the networks 28*a* and 28*c* and comprise the load circuits for the corresponding semiconductors. These networks individually include parallel-connected condensers and a resistor and have a series inductor coupled between related terminals of the condensers. The network 28*a* comprises the condensers 52*a*, 53*a*, the resistor 67*a*, and the inductor 54*a* and the network 28*c* comprises similar elements.

Triode vacuum tubes are utilized as the amplifiers 130*a*, 130*b*, and 130*c*, each including an anode load circuit. The anode load circuit of the tube 130*a* comprises a series connection of inductors 55*a* and 57*a* and a resistor 56*a* coupled between the anode of the triode 130*a* and a source of potential +B, by-pass condensers 78*a* and 79*a* being effectively connected between the terminals of the inductor 55*a* and ground. The anode load circuits of the tubes 130*b* and 130*c* include similar arrangements of corresponding components. The condensers in the load circuits are represented by dotted-line construction to indicate that they may be provided by physical components or stray or interelectrode capacitance. The anode load circuits of the tubes 130*a* and 130*b* are arranged to effect translation of a band of signals through these amplifiers at frequencies in the pass band of 0–1 megacycle while the corresponding load circuit of the tube 130*c* is arranged to effect translation therethrough of frequencies in the band of 0–0.5 megacycle. The output circuits of the amplifiers are individually connected through the terminals 26*a*, 26*b*, and 26*c* to individual ones of the cathodes in the cathode-ray tube of the image-reproducing device 16. As fully described in the article in the June 1950 issue of the RCA Review previously referred to, each of the beams emitted by each of the cathodes in the device 16 is arranged to effect reproduction in the device of one of the basic colors of the reproduced image.

There is also coupled to the network 77 a balanced parallel tuned circuit 58 comprising an inductor 59 and series-connected condensers 60 and 61, the common connection of the latter being grounded. The circuit 58 is arranged to provide a tuned circuit resonant at frequencies in the band of 2.5–4 megacycles and having signals developed in the two portions thereof 180° out of phase with each other. The inductor 59 is inductively coupled to the inductor 50 so as to effect a 90° phase shift between the signals in the circuit 77 and the circuit 58. Individual terminals of inductor 59 are coupled to individual ones of the gated amplifiers 135*a* and 135*b*, each of the latter including an inductive winding comprising individual portions of a bifilar winding 62, coupled between the anode of the amplifier tube thereof and a common source of potential +B. The bifilar winding 62 is untuned and is inductively coupled to a parallel-resonant circuit 63 including inductor 64 and condenser 65 having band-pass characteristics similar to those of the circuit 77 so that the signals developed in the circuit 63 are +90° out of phase with those in the circuit 29, the phase polarity of the developed signals being determined by the units 135*a* and 135*b*. The control circuits of the gated amplifiers 135*a* and 135*b* are coupled to the terminals 20, 20.

The color wave-signal generator 31 is coupled to the anodes of the semiconductors in the detector circuits 27*a* and 127*c* through coupling condensers 66*a* and 66*c* respectively. In each of the detector circuits 27*a* and 127*c* a source of bias potential is provided by a voltage divider coupled between a suitable source of potential +C and ground. Thus in the circuit 27*a* resistors 68*a*, 69*a* are connected in series between a source of +C potential and ground, the common terminal of the resistors 68*a* and 69*a* being connected to the common terminal of the condensers 52*a* and 53*a*. A similar voltage divider comprising resistors 68*c* and 69*c* is connected in a similar manner in the circuit 127*c*. Also a biasing network for the amplifier 130*a* includes a voltage divider comprising resistors 70 and 71 connected between the source of potential +C and ground and also includes a signal by-pass condenser 72 connected between the control electrode of the triode in the amplifier 130*a* and ground. The positive bias provided by the source of potential +C is proportioned to cancel out part of the negative bias developed by the injected subcarrier across the detector load circuits.

The arrangement of the amplifiers 130*a* and 130*b* is such that the signals developed in the anode circuits thereof are 180° out-of-phase and thus the required phase inversion of the signal related to green is effected. To effect such purpose, the cathodes of the amplifiers 130*a* and 130*b* are connected together and include a common load resistor 74 coupled therebetween and ground. It is seen that the amplifiers 130*a* and 130*b* are of the cathode-follower type, being coupled together by the common cathode resistor 74. The latter is so proportioned as to be approximately equal to the cathode input impedance of the amplifier 130*a* in order to give a gain of approximately one-half in the amplifier 130*a* with respect to the amplifier 130*b*.

The deflection windings in the cathode-ray tube of the image-reproducing device are adapted to be connected through the terminals 73, 73 to output terminals of suitable line-frequency and field-frequency generators of the type represented by units 18 and 19, respectively, in Fig. 1.

*Operation of Fig. 4 embodiment of invention*

Considering now the operation of the embodiment represented by Fig. 4, the composite video-frequency signal is applied to the terminals 25, 25 and the brightness component thereof is translated through the network 23 and applied to the intensity control electrode of the cathode-ray tube in the image-reproducing device 16. The 2.5–4 megacycle portion of the signal applied to the terminals 25, 25, comprising the composite color-signal component, is translated through the amplifier and band-pass filter network 29 and developed across the circuit 77 for application to the cathode of the semiconductor in the detector circuit 27*a*. The locally injected wave signal is applied to the anode of the detector 27*a* from the generator 31. These two signals combine across the detector 27*a* to develop a signal related to the red color-signal component, specifically $R-M$, across the load resistor 67*a*. In this manner, the 0–1 megacycle portion of the derived color-signal component related to the green and red colors of the image is translated through the filter network 28*a* and applied to the control electrode of the triode in the amplifier 130*b* wherein it is amplified and applied through the load circuit thereof to that cathode in the cathode-ray tube of the image-reproducing device 16 which is arranged to effect reproduction of the red color characteristic of the image.

A portion of the signal amplified in the amplifier 130*b* is developed across the resistor 74 in the cathode circuit thereof. Since the resistor 74 is proportioned to have an impedance approximately equal to that of the cathode input impedance of the triode of the amplifier 130*a*, one-half of the total amplified signal in the amplifier 130*a* is developed across the resistor 74 and a signal having approximately one-half the amplitude of and being 180° out of phase with the signal in the output circuit of the amplifier 130*b* is developed in the output circuit of the amplifier 130*a*. The latter signal is then applied to that cathode in the cathode-ray tube of the image-reproducing device 16 which is arranged to effect reproduction of the green color characteristic of the image.

The coupling between the circuit 58 and the circuit 77 causes a 90° out-of-phase signal to be developed in the circuit 58. There are developed on the terminals of the inductor 59, with respect to ground, signals which are 180° out of phase with each other and shifted 90° with respect to the signal applied to the semiconductor in the detector circuit 27a. The latter signals are applied, respectively, to the gated amplifiers 135a and 135b. On every other field, as controlled by a signal applied to the terminals 20, 20 in the manner previously described, one or the other of the gated amplifiers 135a and 135b conducts and thereby develops a signal in a winding of the bifilar winding 62. The signal currents which are developed in the windings of the bifilar winding 62 are shifted 90° with respect to the signals in the circuit 29 and are alternately 180° out-of-phase on alternate fields. Because of the type of coupling employed, the signal in the bifilar winding 62 is translated without phase shift through the resonant circuit 63 and applied to the cathode of the detector 127c. The functioning of the circuit including the detector 127c, the network 28c, and the amplifier 130c is then similar to the functioning of the circuit including the detector 27a, the network 28a, and the amplifier 130a and there is derived a signal related to blue, specifically B—M. As a result of the operation of the gated amplifiers 135a and 135b individually on alternate fields, the signal developed on the cathode of device 16 coupled to the terminal 26c, the electron beam developed by this cathode being arranged to effect reproduction of the blue color characteristic of the image, is alternately derived 90° and 270° out of phase with the derivation of each of the signals developed on the cathodes coupled to the terminals 26a and 26b respectively.

It is seen that the embodiment represented by Fig. 4 has certain advantages over that of Fig. 3. In the embodiment of Fig. 4, simple but effective synchronous detector circuits are utilized; the amplifiers 130a, 130b, and 130c are designed to utilize relatively few components; and the cathode-ray tube 16 is arranged to effect isolation of the signals in the output circuits of the amplifiers 130a, 130b, and 130c while combining each thereof with the brightness signal in the output circuit of the unit 23 to reproduce the color image. There is another important difference between the embodiments of Figs. 3 and 4. In the embodiment of Fig. 4 the composite color signal translated through the unit 29 is the signal that is delayed in phase as it is applied to the detector 127c, this delay being effected by the 90° and 180° phase-shifting characteristics of inductively coupled circuits, thereby eliminating the need for delay lines and causing the coupling circuits to perform two functions.

In describing the structure of the Fig. 4 embodiment and explaining the operation thereof, it has been stated that the alternate positioning of the component representative of blue is effected by means of the gated amplifiers 135a and 135b operating on the composite color signal applied to the detector 127c. It should be understood that the 90° and 270° phase positions of the component representative of blue can be obtained equally as well at other points in the channel arranged to translate that component. Thus suitable phase-delay devices and gating amplifiers might be included in the output circuit of the detector 127c or of the amplifier 130c.

Figure 5:
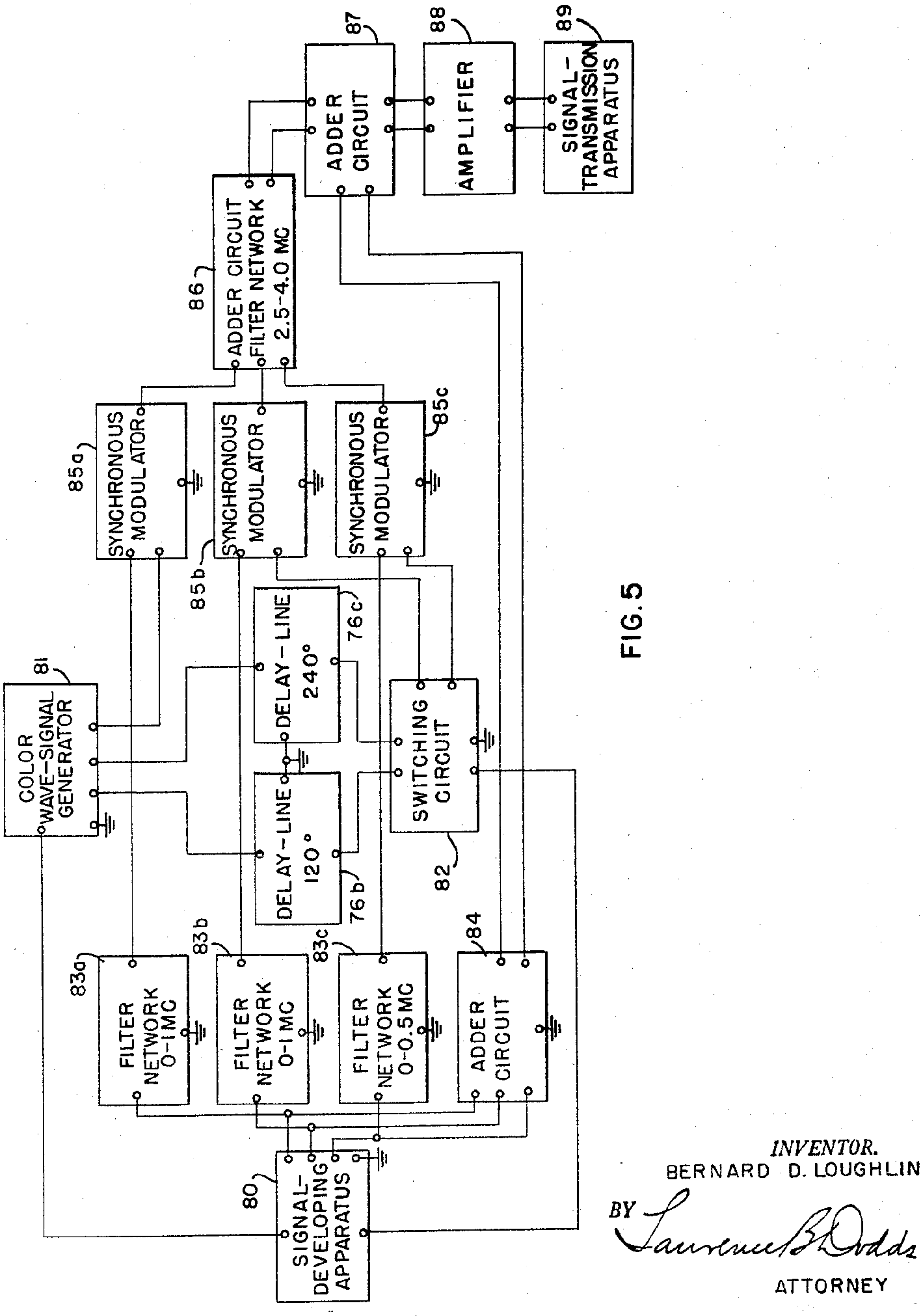
Figure 6:
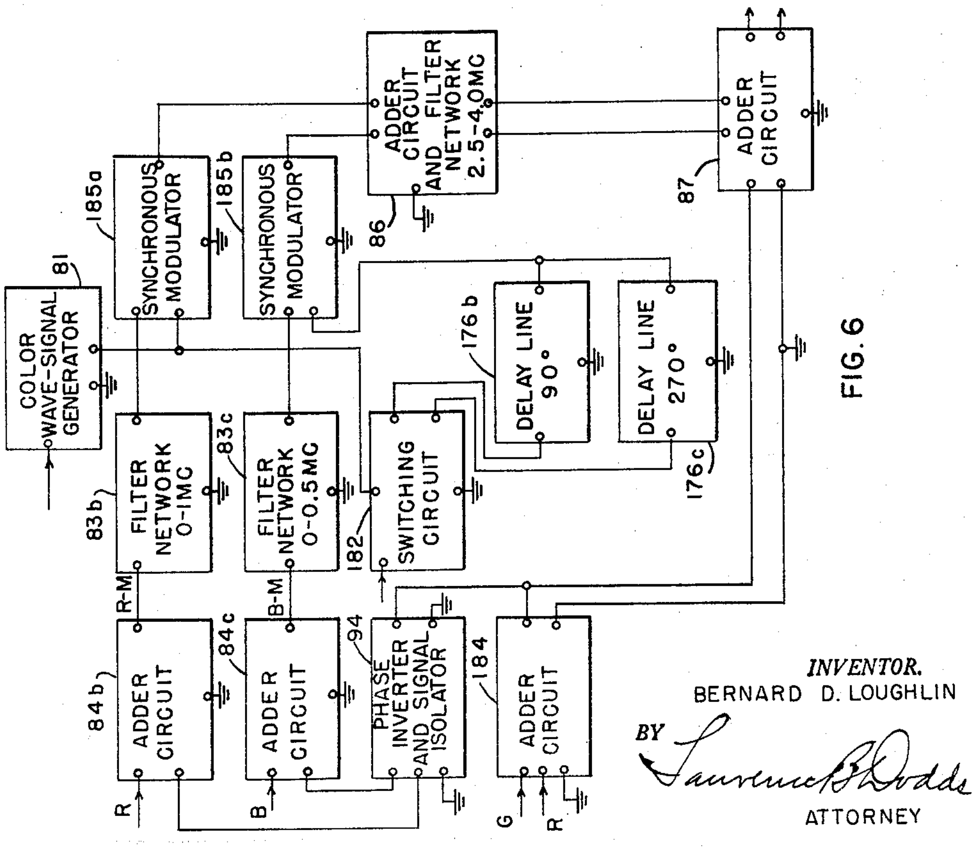
Fig. 6 is a schematic diagram of a modification of the transmitter of Fig. 5.

*Description of color-television transmitter of Figs. 5 and 6*

In order that the present invention be operative, it is necessary that complementary operations occur at the transmitter and the receiver of the color-television system. The arrangement at the receiver of the system, alternately to modify the sequence in which the color-signal components are derived, has been described above with reference to Figs. 1, 3, and 4. A similar modification is required at the transmitter in order that the signals modulate the color wave signal in a sequence in synchronism with the alternating sequence at the receiver. The transmitter represented by Fig. 5 provides an arrangement to effect such result for a system of which the receiver of Fig. 1 is a unit and Fig. 6 represents a modification of the transmitter of Fig. 5 for use in systems of which the receivers of Figs. 3 and 4 are units. A system such as that of Fig. 5 might also be used with receivers of the types represented by Figs. 3 and 4 if suitable intermixing of the video-frequency components occurred at the transmitter. However, for purposes of simplicity and clarity, Fig. 6 will be described as the type of transmitter for units such as represented by Figs. 3 and 4.

Referring now to Fig. 5, the transmitter represented therein comprises a signal-developing apparatus 80 which is arranged to develop color signals related to corresponding colors of an image being televised and including brightness information with relation thereto. The apparatus 80 may include television cameras and related equipment conventionally used to develop color signals of the type described. The equipment in the apparatus 80 utilized for timing the operation of the cameras is also coupled to a color wave-signal generator 81 and to a switching circuit 82 to be described in more detail hereinafter. Individual output circuits of the apparatus 80 are coupled to individual ones of the filter networks 83a, 83b, and 83c and are collectively coupled to an adder circuit 84. Individual ones of the networks 83a, 83b, and 83c are coupled to synchronous modulators 85a, 85b, and 85c, respectively, the output circuits of which are individually coupled to input circuits of a combination adder circuit and 2.5–4 megacycle filter network 86. The output circuit of the unit 86 is coupled to one input circuit of another adder circuit 87 while the output circuit of the unit 84 is coupled to another input circuit thereof. The output circuit of the unit 87 is coupled through an amplifier 88 to a signal-transmission apparatus 89. The apparatus 89 may be of conventional type including a wave-signal modulation circuit and means for radiating the modulated wave signal or simply an amplifier for applying signals to a transmission line.

One output circuit of the generator 81 is coupled to the modulator 85a. Two other output circuits of the unit 81 are coupled through the delay networks 76b and 76c and the switching circuit 82 to individual ones of the modulators 85b and 85c. The switching circuit 82 may be similar to that of Fig. 1a previously described. It is arranged alternately to connect the output circuits of the delay lines 76b and 76c to input circuits of the modulators 85b and 85c so that the sequence in which the modulators 85b and 85c operate with respect to the modulator 85a is reversed on every other field.

The adder circuits 84, 86, and 87 may be of any conventional type, one form of an adder circuit being an arrangement of a plurality of pentode tubes, one for each signal to be added, having their anode circuits connected in parallel and having each of the signals to be added applied to individual ones of the control electrodes of the tubes.

In the modification represented by Fig. 6, the transmitter is arranged to operate in a system wherein quadrature modulation of the subcarrier wave signal is employed and the other signal characteristics mentioned with reference to Figs. 3 and 4 are utilized. Similar units to those of Fig. 5 are designated by similar reference numerals and analogous units by similar reference numerals with 100 added thereto. A phase inverter 94 including a signal isolation circuit is coupled to the output circuit of the unit 184 and has separate output circuits coupled to individual ones of the input circuits of units 84b and 84c, the output circuits of the latter being coupled, respectively, to the input circuits of the units 83b and 83c.

An output circuit of the generator 81 is coupled through the switching circuit 182 and alternately through one of the delay lines 176b and 176c to an input circuit of the modulator 185b. The switching circuit 182 is similar to that described with reference to Figs. 3 and 4 and is arranged to couple the signal generated in the generator 81 alternately through the delay lines 176b and 176c to the modulator 185b. The input circuits of the unit 184 are coupled only to those cameras developing signals representative of the green and red colors of the image.

*Explanation of operation of transmitters of Fig. 5 and Fig. 6*

Referring now to the operation of the transmitter of Fig. 5, color wave signals related to the basic color characteristics of a televised image, specifically related to the colors green, red, and blue thereof, are developed in the apparatus 80 in any conventional manner. These signals are then individually applied to the networks 83a, 83b, and 83c, translated therethrough and individually applied to the modulators 85a, 85b, and 85c. In the modulators 85a, 85b, and 85c, the signals effectively modulate in a time-sequential manner at desired phase relationships the wave signal applied to the modulators by the generator 81. The sequence in which the signals related to the green, red, and blue colors of the image modulate the wave signal is determined by the condition of the switching circuit 82 in the manner previously described with reference to the receiver of Fig. 1. The signal related to green modulates the wave signal at 0° phase and the signals related to red and blue alternately on every other field modulate the wave signal at 120° and 240° phase points. The output signals of the modulators 85a, 85b, and 85c are added in the circuit 86 and the 2.5–4 megacycle portions thereof are applied to an input circuit of the adder circuit 87.

The individual color signals in the output circuit of the apparatus 80 are applied to the adder circuit 84 wherein they are combined to develop a signal related to the brightness of the televised image. This signal is defined by Equation 1 above. This signal is then applied to an input circuit of the adder circuit 87 wherein it combines with the composite color-signal component applied thereto from the unit 86 to develop a composite video-frequency signal. The latter signal is then translated through the amplifier 88 and transmitted by means of apparatus 89 in a conventional manner.

In the modification represented by Fig. 6, the signal representative of red is applied to the circuit 84b, that of blue to the circuit 84c, and signals representative of both green and red to the circuit 184. The signals in the networks 84b and 84c each have a negative brightness signal added thereto by means of the unit 94 to develop, respectively, $R-M$ and $B-M$ output signals which are translated, respectively, through the units 83b and 83c. These signals then modulate the wave signal developed in the generator 81, respectively, in the modulators 185a and 185b. The $R-M$ signal modulates the wave signal in-phase and the $B-M$ signal modulates the wave signal alternately in every other field at 90° or 270° phase points by the operation of the switching circuit 182. In this way the wave signal is applied to the modulator 185c alternately through the delay lines 176b and 176c. The signal developed in the output circuit of the unit 184 is a monochrome signal representative of the brightness of the image and having only green and red signal components. This signal is defined by Equation 8 above.

Figure 7:
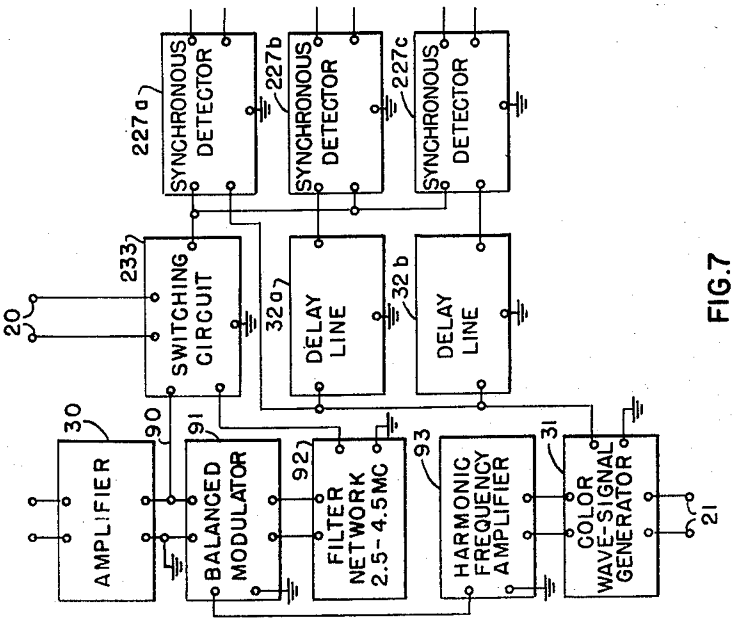

*Description of embodiment of invention represented by Fig. 7*

The previous embodiments of the invention have presented a switching circuit by means of which the time or phase of application of either the composite color signal or the locally generated color wave signal to at least one of the synchronous detectors is periodically changed by predetermined amounts. When a time-sequentially modulated wave signal including at least portions of both side bands thereof is heterodyned with a second harmonic of the wave signal, another modulated wave signal having the same mean frequency as the first-mentioned wave signal is developed and has a frequency spectrum which is inverted with respect to that of the first-mentioned wave signal. For example, if a 3.5 megacycle wave signal having side bands extending from 2.5 to 4 megacycles heterodynes with a 7 megacycle wave signal, a 3.5 megacycle wave signal having side bands extending from 3 to 4.5 megacycles is developed. It is seen that what previously had been the lower side band of the wave signal is now the upper side band and the previous upper side band is now the lower side band. This reversal of spectrum also effects a reversal of the phase positioning of the modulation signals on the developed wave signal with respect to those on the first-mentioned wave signal. By adjusting the phasing between the signals to be heterodyned, at least one of the modulation components on the first-mentioned wave signal and the developed wave signal related thereto can be made to occur in phase coincidence on the two wave signals.

Previously it has been shown with respect to Fig. 1, that the sequence of the modulation components should be periodically varied to practice the present invention. This implies, as represented by Figs. 2b and 2e, that at least one component of the modulation components continuously occurs at the same position, that is, in phase coincidence, in each cycle and that the quadrature component is effectively reversed in sign. In view of the effects discussed in the previous paragraph, it is seen that the interchange of the other modulation components may be effected by properly phasing the fundamental wave signal and a second harmonic thereof, so that the one component occurs in phase coincidence on both the fundamental and developed wave signals while the other components occur in interchanged positions on the two wave signals. Then if the fundamental wave signal and the developed wave signal are alternately utilized for the translation of the modulation components, the desired periodic change in sequence will be effected. Fig. 7 represents a portion of a receiver for utilizing such teaching to effect the desired results.

Referring now to Fig. 7, since the portion of the receiver represented is related to a similar portion of the signal-translating system 15 of the receiver of Fig. 1, similar components are designated by the same reference numerals and related components by the same reference numerals with 200 added thereto. The output circuit of the amplifier 30 is coupled through two different channels to separate input circuits in the switching circuit 233. One of these channels is represented by a conductor 90 and the other of the channels includes series-connected balanced modulator 91 and a 2.5–4.5 megacycle filter network 92. The circuit of the switching circuit 233, which is arranged to be connected to either of the separate input circuits thereof, is coupled to individual input circuits of the synchronous detectors 227a 227b, and 227c. The color wave-signal generator 31 has an output circuit coupled directly to an input circuit of the synchronous detector 227a, coupled through the delay line 32a to an input circuit of the detector 227b and coupled through a delay line 32b to an input circuit of the detector 227c. The generator 31 also has coupled to an output circuit thereof a harmonic-frequency amplifier 93 proportioned to amplify the second harmonic of the signal developed in the generator 31, the unit 93 having an output circuit coupled to an input circuit of the modulator 91.

*Explanation of operation of the portion of receiver of Fig. 7*

Considering now the explanation of the operation of the portion of the receiver represented by Fig. 7, the composite color signal in the output circuit of the amplifier 30 having, as described with reference to Fig. 1, frequencies between 2.5 and 4 megacycles, is applied over the conductor 90 to one circuit of the switching circuit 233. The composite color signal is also applied to the balanced modulator 91 wherein it is heterodyned with a signal injected from the amplifier 93 and which is the second harmonic of the wave signal developed in the generator 31. If the signal developed in the generator 31 is assumed to have a frequency of 3.5 megacycles, a type of signal frequently used, then the signal in the output circuit of the modulator is a modulated wave signal having a mean frequency of 7 megacycles and a developed modulated wave signal of 3.5 megacycles having approximately 3–4.5 megacycle side bands. The latter signal is translated through the 2.5–4.5 megacycle filter network 92 and applied to another circuit of the switching circuit 233. The color wave-signal generator applies to the detectors 227*a*, 227*b*, 227*c* signals in proper phase relationship to derive the color-signal components of the modulated wave signal applied thereto in a predetermined sequence.

Periodically, specifically on every other field, the switching circuit 233 alternately couples the channel including the conductor 90 and the channel incuding the units 91 and 92 to input circuits of the detectors 227*a*, 227*b*, and 227*c*. When the channel including the conductor 90 is coupled to the detectors, the manner of operation thereof is conventional and the predetermined sequence of derived color-signal components occurs. When the channel including the modulator 91 and the filter network 92 is coupled to the input circuit of detectors 227*a*, 227*b*, and 227*c*, there is developed in the modulator 91 a modulated wave signal having twice the mean frequency of the conventional subcarrier wave signal. As previously described, this higher frequency wave signal includes a developed wave signal having the same frequency as the wave signal translated through the amplifier 30 and having a frequency spectrum inverted with respect to the latter wave signal, resulting in an inverted sequence of the modulation components. When these components are derived in a predetermined order by the detectors 227*a*, 227*b*, and 227*c*, the difference in sequence in which the components occur on the two wave signals results in a difference in the sequence of the derived signals. Thus, the periodic change in sequence is effected by having the switching circuit 233 alternately couple on every other field the signals translated over the channel including the conductor 90 and the signals translated over the channel including units 91 and 92 to input circuits of the detectors 227*a*, 227*b*, 227*c*.

A receiver including a signal-translating system of the type described with reference to Fig. 7 may utilize any composite color signal having the modulation components thereof both in such a phase relation thereto that the synchronous detectors of the receiver are arranged to derive such components and having an alternating sequence of these components such that the switching circuit of the receiver properly derives the components. The transmitter of such a system is not required to develop the alternating sequence in a manner similar to that described with reference to Fig. 7, though, if desired, a transmitter may be arranged to employ a signal-translating system similar to that of Fig. 7. It is believed that the necessary modifications of either of the embodiments of Figs. 5 and 6 to produce a transmitter having a signal-translating system which functions in a manner complementary to that of the system of Fig. 7 are obvious and no further description thereof will be presented herein.

With respect to the embodiments of the invention considered herein, the description of each thereof has been simplified for purposes of clarity by referring only to those components which are fundamental to each arrangement. It is to be understood that other components, additional and alternate to those described, may be utilized. Also, wherever needed to equalize the time of translation of signals over different paths, equalizing circuits should be employed.

The invention has been described herein with reference to the utilization of switching circuits that change the sequence in which the color-signal components are derived at a frequency related to the field frequency, specifically, on every other field. It is to be understood that the switching process can be related to the frame frequency or to the line frequency or to a dot frequency or even to an arbitrary unit composed of groups of lines or dots or both and need not be limited to operation at field frequency as described. In fact, for purposes of reducing the interline flicker that may occur if the switching sequence is operated at a frame frequency, it may be desirable to have the switching occur at a rate related to the scanning of a predetermined group of lines so that the switching frequency is increased.

There is another aspect of the invention that has not been considered in detail herein because the structure required to obtain the results now to be discussed and to obtain the results previously considered is the same. In the inventor's copending application Serial No. 190,186, filed October 14, 1950, entitled "Television Apparatus," there is described an apparatus for deriving the color-signal components so that undesired interference patterns resulting from any intermodulation of the components or from other causes do not appear as bothersome effects in the reproduced image. That application teaches that the interference pattern should be caused to occur in the reproduced image in such a manner as to be of low visibility. This effect is produced by having the deriving means operated at such a frequency that the elemental areas of the interference patterns are displaced on adjacent lines in space. One form of the present invention teaches the diminishing of the effects of color errors by causing such errors to be of opposite sign on adjacent lines in space. With respect to such teaching, it is also seen that the present invention by having the sequence in which the modulation components are derived periodically changed inherently causes any interference patterns resulting from the color subcarrier wave signal to oscillate in a manner related to such periodicity. Thus a somewhat random occurrence of these interference patterns is effected resulting in a low visibility thereof and thereby effectively diminishing them in the reproduced image.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a color-television receiver for translating a received subcarrier wave signal periodically modulated in different phase sequencies by color-signal components which are representative of the color characteristics of an image to be reproduced, a signal-translating system comprising: circuit means for supplying said modulated subcarrier wave signal; detecting means coupled to said supply circuit means for deriving from said modulated subcarrier wave signal signals individually related to said color-signal components; and means coupled to said detecting means for causing said detecting means to derive said related signals in two phase sequences, whereby the color fidelity of the image to be reproduced is improved.

2. In a color-television receiver for translating a received subcarrier wave signal periodically modulated in different phase sequences by color-signal components which are representative of the color characteristics of an image, a signal-translating system comprising: means for deriving from said modulated subcarrier wave signal signals effectively and individually related to said color-signal components; means coupled to said deriving means for maintaining its operation in substantially synchronous relation with and at substantially desired phase relations with said modulated subcarrier wave signal for causing said deriving means to derive said related signals in one phase sequence; and a control device coupled to said deriving means for recurrently causing said deriving means effectively to derive said related signals in another phase sequence, whereby the color fidelity of an image reproduced from said related signals is improved.

3. In a color-television receiver for translating a received subcarrier wave signal each cycle of which is periodically modulated in different phase sequences by color-signal components which are representative of the color characteristics of an image, a signal-translating system comprising: a plurality of synchronous detectors for deriving from said modulated subcarrier wave signal signals effectively and individually related to said color-signal components; means coupled to each of said detectors arranged to maintain said detectors in substantially synchronous relation with and at substantially desired phase relations with said received subcarrier wave signal and for causing said detectors effectively to derive said related signals from substantially each cycle of said modulated subcarrier wave signal occurring during recurring intervals in one phase sequence; and a control device coupled to at least one of said detectors for recurrently causing said detectors to derive said related signals from substantially each cycle of said modulated subcarrier wave signal occurring during intervening intervals in another phase sequence, whereby the color fidelity of an image reproduced from said related signals is improved over a wide range of deviations from said desired phase relations of said deriving means and said received subcarrier wave signal.

4. In a color-television transmitter, a signal-translating system comprising: means for developing a plurality of color signals individually representative of the color characteristics of an image; means for developing a subcarrier wave signal; and means coupled to said signal-developing means for modulating said subcarrier wave signal by components of said color signals in two phase sequences.

5. A color-television transmitter comprising: means for developing a plurality of color signals individually representative of the color characteristics of an image; means for developing a subcarrier wave signal; means coupled to said signal-developing means for modulating substantially each cycle of said wave signal occurring during recurring intervals by components of each of said color signals in a first phase sequence; a control device coupled to said modulating means for periodically causing said components of said color signals to modulate substantially each cycle of said wave signal occurring during intervals intervening said recurring intervals in a second phase sequence; and means for translating said modulated subcarrier wave signal.

6. A color-television transmitter comprising: means for developing a plurality of color signals individually representative of the color characteristics of an image; a plurality of signal-translating channels coupled to said developing means for individually translating different ones of said color signals; means for generating a subcarrier wave signal; modulator means coupled to each of said channels and to said subcarrier signal-generating means for modulating substantially each cycle of said subcarrier wave signal occurring during recurring intervals by components of said color signals in a first phase sequence; a control device coupled between at least one of said channels and said modulator for causing said modulator to be periodically coupled to said one channel in a different manner for modulating substantially each cycle of said wave signal occurring during intervals intervening said recurring intervals by components of said color signals in a second phase sequence; and means for translating said modulated subcarrier wave signal.

7. A color-television system comprising: a transmitter including means for developing a plurality of color signals individually representative of the color characteristics of an image, means for developing a subcarrier wave signal, means coupled to said signal-developing means for modulating said subcarrier wave signal by components of said color signals in two phase sequences, means for developing a signal related to the brightness of the image, and means coupled to said modulating means and said brightness-signal developing means for transmitting said brightness signal and modulated subcarrier wave signal; and a receiver including circuit means for supplying said modulated subcarrier wave signal, detecting means coupled to said supply circuit means for deriving from said modulated subcarrier wave signal signals individually related to said color-signal components, and means coupled to said detecting means for causing said detecting means to derive said related signals in two phase sequences, circuit means for supplying said brightness signal, and color image-reproducing means responsive to said brightness signal and to said related signals for reproducing a color image, whereby the color fidelity of the reproduced image is improved.

8. A color-television system comprising: a transmitter including means for developing a plurality of color signals individually representative of the color characteristics of an image, means for developing a subcarrier wave signal, means for modulating substantially each cycle of said wave signal occurring during recurring intervals by components of each of said color signals in a first phase sequence, means for periodically causing said components of said color signals to modulate substantially each cycle of said wave signal occurring during intervals intervening said recurring intervals in at least a second phase sequence, and means for translating said modulated subcarrier wave signal; and a receiver for said translated modulated subcarrier wave signal including means for deriving therefrom signals effectively and individually related to said color-signal components, means coupled to said deriving means for maintaining its operation in substantially synchronous relation with and at substantially desired phase relations with said modulated subcarrier wave signal and for causing said deriving means effectively to derive said related signals in one phase sequence related to said first phase sequence, and means for recurrently causing said deriving means effectively to derive said related signals in another phase sequence related to said second phase sequence, whereby the color fidelity of an image reproduced from said related signals is improved over a wide range of deviations from said desired phase relations of said deriving means and said received subcarrier wave signal.

9. A color-television system comprising: a transmitter including means for developing a plurality of color signals individually representative of the color characteristics of an image, means for developing a subcarrier wave signal, means for modulating substantially each cycle of said wave signal occurring during recurring scanning fields by components of each of said color signals in a first phase sequence, means for periodically causing said components of said color signals to modulate substantially each cycle of said wave signal occurring during scanning fields intervening said recurring fields in at least a second phase sequence, and means for translating said modulated subcarrier wave signal; and a receiver for said translated modulated subcarrier wave signal including means for deriving therefrom signals effectively and individually related to said color-signal components, means coupled to said deriving means for maintaining its operation in substantially synchronous relation with and at substantially desired phase relations with said modulated subcarrier wave signal and for causing said deriving means effectively to derive said related signals during said recurring fields in one phase sequence related to said first phase sequence, and means for recurrently causing said deriving means effectively to derive said related signals during said intervening fields in another phase sequence related to said second phase sequence, whereby the color fidelity of an image reproduced from said related signals is improved over a wide range of deviations from said desired phase relations of said deriving means and said received subcarrier wave signal.

References Cited in the file of this patent

UNITED STATES PATENTS

| | | |
|---|---|---|
| 2,773,929 | Loughlin | Dec. 11, 1956 |
| 2,774,072 | Loughlin | Dec. 11, 1956 |

OTHER REFERENCES

Introduction to Color Television, Admiral Corp., February 1954, pages 11 to 16.

A Six-Megacycle Compatible High-Definition Color Television System, R.C.A. Review, 1949, vol. X, pages 504 to 524.